(12) United States Patent
Boodman et al.

(10) Patent No.: US 11,785,083 B2
(45) Date of Patent: *Oct. 10, 2023

(54) SYSTEM AND METHOD FOR OFFLINE-FIRST APPLICATION DEVELOPMENT

(71) Applicant: ROCICORP, LLC, Kailua, HI (US)

(72) Inventors: Aaron Boodman, Kailua, HI (US); Fritz Schneider, Paia, HI (US); Erik Arvidsson, San Francisco, CA (US)

(73) Assignee: ROCICORP, LLC, Kailua, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,962

(22) Filed: Jan. 11, 2023

(65) Prior Publication Data

US 2023/0156081 A1    May 18, 2023

Related U.S. Application Data

(63) Continuation of application No. 17/584,742, filed on Jan. 26, 2022, now Pat. No. 11,582,302.

(Continued)

(51) Int. Cl.
*H04L 67/1095* (2022.01)
*G06F 15/173* (2006.01)

(52) U.S. Cl.
CPC .... *H04L 67/1095* (2013.01); *G06F 15/17331* (2013.01)

(58) Field of Classification Search
None
See application file for complete search history.

(56) References Cited

U.S. PATENT DOCUMENTS

| 7,085,904 B2 | 8/2006 | Mizuno et al. |
| 2007/0128899 A1* | 6/2007 | Mayer .................. G06F 9/4406 439/152 |

(Continued)

OTHER PUBLICATIONS

Konstantopoulos et al., "Distributed Personal Cloud Storage without Third Parties", Nov. 22, 2019, IEEE, IEEE Transactions on Parallel and Distributed Systems (vol. 30, Issue: 11, pp. 2434-2448) (Year: 2019).*

(Continued)

*Primary Examiner* — Davoud A Zand
(74) *Attorney, Agent, or Firm* — Gordon Rees Scully Mansukhani LLP; David R. Heckadon

(57) ABSTRACT

A system to synchronize application data bidirectionally between N clients and one server, by:
(a) pushing mutations made in the client to the server, wherein each mutation is comprised of a mutation name identifying the type of mutation, and arguments provided by the application modifying the behavior of the mutation, and the pusher also pushes a client ID and mutation ID for each mutation to the server;
(b) pulling server differentials to the client;
(c) storing key/value pairs in a versioned cache, wherein the keys are text strings and the values are data provided by an application in the client; and
(d) resolving conflicts between the client and the server with a rebaser that:
forks the cache to create a synch branch when the client receives the latest server differential,
applies the latest received server differential to the synch branch,
applies only those mutations to the synch branch that have not already been acknowledged by the server, and then
makes the synch branch the main branch of the cache.

17 Claims, 11 Drawing Sheets

Related U.S. Application Data

(60) Provisional application No. 63/142,410, filed on Jan. 27, 2021.

(56) References Cited

U.S. PATENT DOCUMENTS

| | | | |
|---|---|---|---|
| 2007/0162308 A1* | 7/2007 | Peters | G06Q 10/06 |
| | | | 705/2 |
| 2008/0120350 A1 | 5/2008 | Grabowski et al. | |
| 2017/0262345 A1* | 9/2017 | Wang | G06F 11/1469 |
| 2017/0357682 A1 | 12/2017 | Matsuda | |
| 2018/0373874 A1* | 12/2018 | Spernow | G06F 21/568 |

OTHER PUBLICATIONS

Wang et al., Forkbase: An Efficient Storage Engine for Blockchain and Forkable Applications, Feb. 14, 2018, 15 pages.

* cited by examiner

SYSTEM AND METHOD FOR OFFLINE-FIRST APPLICATION DEVELOPMENT

CROSS-REFERENCES TO RELATED APPLICATIONS

This application is a Continuation of U.S. patent application Ser. No. 17/584,742, of same title, filed Jan. 26, 2022, which claims priority to U.S. Provisional Patent Application Ser. No. 63/142,410, of same title, filed Jan. 27, 2021, the entire disclosure of which is incorporated herein by reference in its entirety for all purposes.

TECHNICAL FIELD

The present disclosure relates to a bidirectional sync architecture that allows the resolution of conflicts in a client/server system and facilitates a bidirectional sync against existing web services without significant server-side changes.

BACKGROUND

Network connectivity is never a guarantee, even in highly connected parts of the world. The only way to achieve an always-on experience is with an application ("app") that is operational even when it is offline. For an app to be operational offline, the code and data required for it to function must not be dependent on a network connection. "Offline first" describes a client-server architecture in which an application's core features function with or without an internet connection. Data is read and written locally on an end user's device (client) and periodically uploaded and replicated in the server. This strategy can provide end users with a responsive and reliable user experience when internet connectivity is slow or non-existent. To do this, the architecture pushes data and application logic from the server to the client and most of the processing takes place on the end user's client device.

Classical web application architectures commonly use a "dumb client," in which virtually all processing in a web or mobile application takes place on the server. The server sends static content to a device, and when the user does something, e.g., clicks a button, a request must be sent to the server. The user must wait for confirmation to know if the request went through. This classic architecture is insufficient for use cases that require high amounts of interactivity, like text editors, graphics programs, or video games. These cases too require an "offline-first" approach, not because there may not be a network connection, but because the network connection is too slow to meet the interactivity needs of the application.

Offline-first architecture is easy when there is only one client device allowed to edit data at a time. However, this constraint is too limiting in many cases, so a different design generally called "bidirectional sync" is needed to allow multiple clients to edit shared data locally, without waiting for acknowledgement from the server. Bidirectional synchronization is needed in any case where: (a) multiple users can edit same data, and (b) the clients cannot wait for confirmation from the server. It is used especially when multiple users are going to be editing the same data and a need for a highly interactive experience is required. Unfortunately, even when the connection is good, it's often not fast enough to provide word-processor or video-game level responsiveness. But bidirectional sync has several core challenges: (i) ensuring all changes from all clients are eventually reported and reflected on the server; (ii) ensuring that only the server is allowed to determine the result of an operation, and that clients faithfully follow what the server determines; and (iii) handling "conflicts"—where changes made to data on one client aren't valid with respect to changes made concurrently on another device.

Existing attempts to address these problems have one or both of the following limitations. First, many existing systems require the use of a specific database system on the server side. This is impractical for many users because switching costs for server side database systems are high, and because technical requirements for server-side databases are stringent and not easily met. Second, existing systems do not offer a satisfactory solution to the conflict resolution problem. Some systems claim to automatically resolve conflicts, but that is achieved by limiting the data models that can be represented by the database. Other systems allow conflicting writes to proceed, and simply produce a database state that can be invalid. For example, such system might allow a calendaring application to end up with a room booked by two meetings at the same time. Still others allow conflicting writes to proceed, by way of "forking" the database itself, creating two copies of the data—one where each of the conflicting writes occurred, and leaving it to the developer to later patch them together.

For the foregoing reasons, there is a need for a web service architecture that can resolve conflicts in a client/server system that naturally supports complex data structures and invariants (e.g., calendars) and that facilitates bidirectional sync against existing web services without significant server-side changes.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

SUMMARY OF THE INVENTION

The present invention provides a system to synchronize application data bidirectionally between N clients and one server. In one optional preferred aspect, the present system: (a) provides a computer system comprising N clients and a server; (b) for each of the N clients, provides: (i) a pusher that pushes mutations made in the client to the server, wherein each mutation is comprised of: a unique per-client mutation ID the mutation, a mutation name identifying the type of mutation, and arguments provided by the application modifying the behavior of the mutation, and the pusher also pushes a client ID for each mutation to the server; (ii) a puller that pulls server differentials to the client; (iii) a versioned cache that: stores key/value pairs, wherein the keys are text strings and the values are data provided by an application in the client, is versioned to store historical versions of the key/value pairs, and is forkable to store parallel historical versions of the key/value pairs; and (iv) a rebaser that resolves conflicts between the client and the server by: forking the cache to create a synch branch when the client receives the latest server differential, applying the latest received server differential to the synch branch, applying only those mutations to the synch branch that have not already been acknowledged by the server, and then making the synch branch the main branch of the cache.

In optional preferred aspects, the system for iteratively generating the server differentials compares snapshots of the server at consecutive periods of time. However, it is to be understood that the present system also encompasses other approaches and systems for generating server differentials all keeping within the scope of the presently claimed system.

In preferred aspects, the server may be any of a web service, a data layer, a single physical server or a plurality of separate physical machines operating together as one logical server, all keeping within the scope of the presently claimed present system. The client may be a web or mobile application, as desired.

Different approaches are contemplated for iteratively generating the server differentials including a computer system located within the server itself such that the server differential is pulled directly from the server to the client, or a computer system located within a differential server that is separate from the server such that the server differential is instead pulled directly from the differential server to the client.

In preferred aspects, the server is an authoritative server that receives client mutations from each of the N clients and then determines whether each of the received client mutations can be executed on the server, or whether to modify the mutation before executing it. In preferred aspects, the server executes each of the mutations sequentially, mapping the received mutations to the individual clients by the client ID and the client mutation ID. Client mutations that cannot be executed on the server are not applied for all of the N clients. Client mutations that can be executed on the server are applied in the same order across all of the N clients. As such, the server incorporates programming that represents each mutation name that is sent by clients, the incorporated programming decides whether to apply, modify, or reject each mutation, and the resulting changes to the server state are sent to each of the other N clients in the pulled server differentials, thereby updating each of the N clients.

The rebaser in the client ensures that branches of the cache are removed from client system memory when the branches are no longer reachable. Data that is no longer needed by a deleted branch is also removed.

Preferably, the server differential is generated as a sequence of operations to the key/value pairs, and a cookie is sent to the client with each server differential. Operations can be of three types: "put" to create or modify a key/value pair, "del" to delete a key/value pair, and "clear" to delete all key/value pairs. As such, the server differential can be calculated for each of the N clients from the cookie sent to that particular client.

In an alternate aspect, the present system provides a method of bi-directional synchronization between N clients and a server, comprising: (a) providing a computer system comprising N clients and a server; (b) for each of the N clients: (i) pushing mutations made in the client to the server, while simultaneously pushing client IDs and client mutation IDs for each mutation to the server; (ii) pulling server differentials to the client; (iii) storing key/value pairs in a versioned cache, wherein the keys are text strings and the values are data provided by an application in the client, (iii) storing historical versions of the key/value pairs in the versioned cache, (iv) applying a rebaser to resolve conflicts between the client and the server by: forking the cache to create a synch branch when the client receives the latest server differential, applying the latest received server differential to the synch branch, applying only those mutations to the synch branch that have not already been acknowledged by the server, and then making the synch branch the main branch of the cache.

In this preferred method, the client mutations and their associated mutation IDs are continuously pushed to the server without waiting for the server to respond to the client. Moreover, the server selects the client mutations to analyze based upon the associated sequential mutation ID for each of the N clients such that the server analyzes the most recent successive mutation that has not previously been analyzed for each of the N clients. As a result, each of the N clients is synchronized to the server independently of the server being synchronized to each of the N clients such that server and client synchronization can be carried out over different periods of time.

A first important advantage of the present system is that mutations can be made to each of the clients without having to wait for server confirmation of that particular mutation. As a result, the clients can each run faster than the server, and can continue to operate normally even if communication between the server and the client is interrupted or goes down for a period of time.

A second advantage of the present system is that different mutations can be made to different clients without having to wait for each of the clients to communicate with one another. This feature is especially beneficial when a large number of clients are communicating with the server and communication to the server is interrupted for one or more of the clients.

A third advantage of the present system is that the server can be authoritative (such that it alone will decide whether a client mutation is acceptable to be executed). As a result, the server programming can make the final decision as to which received mutations are acceptable; however, as explained above, each of the clients are still able to proceed forward even before the server can rule on the acceptability of the particular mutation.

A fourth advantage of the present system is that since the rebaser and versioned cache are located within the client, minimal (or even no) changes need to be made to the server system to operate the present system. Server architecture does not need to be re-designed or re-configured. Databases do not need to be re-designed. Rather, the present system operates as a convenient add on to an existing server system providing bidirectional synchronization (i.e.: synching the clients to the server, and the server to the clients).

A fifth advantage of the present system is that it does not require an excessive amount of memory storage to operate on the client. This is because as new branches are created in the client's versioned cache, the data in old branches are reused to a large extent.

A sixth advantage of the present system is that it provides a novel system where the server only has to analyze the latest mutations it has received from the clients. As such, the server does not have to re-execute or re-analyze client mutations that it has already received. This is preferably accomplished by the server keeping numerical track of all the client mutations, both by mutation ID and client ID. The advantage of this approach is that computer resources are conserved as the server is not spending time re-calculating old client mutations which it has previously seen. Instead, the present system provides a fast and efficient system of synchronization that is not slow or cumbersome.

A seventh advantage of the present system is that by representing change to the system as abstract business-level "mutations", and ordering those mutations in a single linear order on the server, conflicting changes can be more naturally handled. The present system naturally supports complex data structures and invariants such as calendars without requiring significant server-side changes. For example, if a room was booked on two clients at the same time concurrently, when the server received the two bookings, it would pick one to be first, and the mutation code in the second would naturally detect the conflict. That mutation code could elect to automatically modify the requested mutation (i.e., to book a different but similar room), or to reject the mutation, as decided by the application developer. Whatever the developer decides to have the mutation do, all clients will see the change when they pull the next server differential.

An eighth advantage of the present system is that it can be applied to existing systems and architectures without making large changes to their structure.

BRIEF DESCRIPTION OF THE DRAWINGS

The features and advantages of the present disclosure will be more fully described in, or rendered obvious by the following detailed description of the preferred embodiments, which are to be considered together with the accompanying drawings wherein like numbers refer to like parts and further, wherein.

DETAILED DESCRIPTION OF THE DRAWINGS

Figure 1:
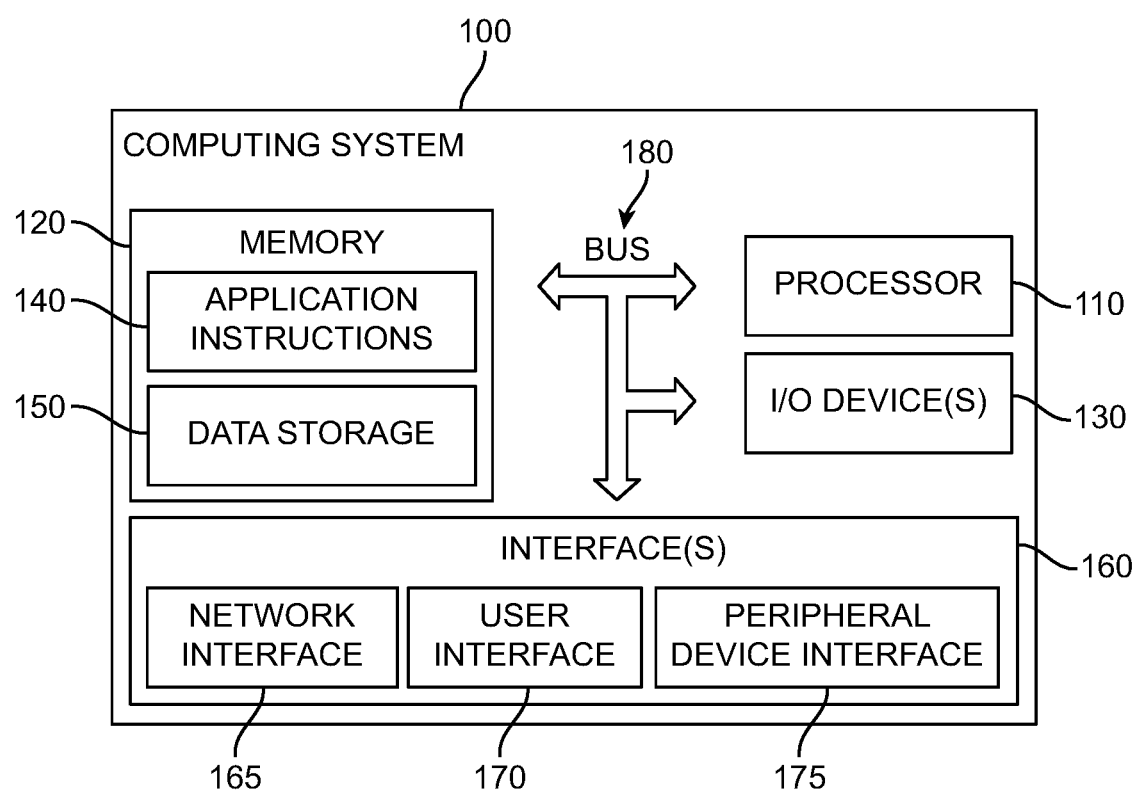
FIG. 1 is a block diagram of a computing system, in accordance with some embodiments described herein.

Reference will now be made in detail to the present preferred embodiment(s), and examples of which is/are illustrated in the accompanying drawings. Whenever possible, the same reference numerals will be used throughout the drawings to refer to the same or like parts. Any specific details of the embodiments are used for demonstration purposes only, and no unnecessary limitations or inferences are to be understood therefrom.

Before describing exemplary embodiments in detail, it is noted the embodiments reside primarily in combinations of components and procedures related to the system. The system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, apparatus, and/or computer program product at any possible technical detail level of integration. A computer program product can include, among other things, a computer-readable storage medium having computer-readable program instructions thereon for causing a processor to carry out aspects of the present disclosure.

In various embodiments, a computer program product comprising a non-transitory computer readable storage medium having program instructions embodied therewith, the program instructions being executable by a computer processor to cause the computer processor to perform a method described herein, is provided.

As shown in FIGS. 1-12, the various embodiments in this disclosure generally relate to computer-implemented methods, and systems for performing the same, related to an offline first client-server architecture and methods for providing bidirectional sync and conflict resolution.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processor(s) 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processor(s) 110 suitable for the execution of computer readable program instructions include both general and special purpose microprocessors and any one or more processors of any digital computing device. For example, each processor 110 may be a single processing unit or a number of processing units, and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithread execution capability, multi-core processors, multi-core processors with software multithread execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Figure 2:
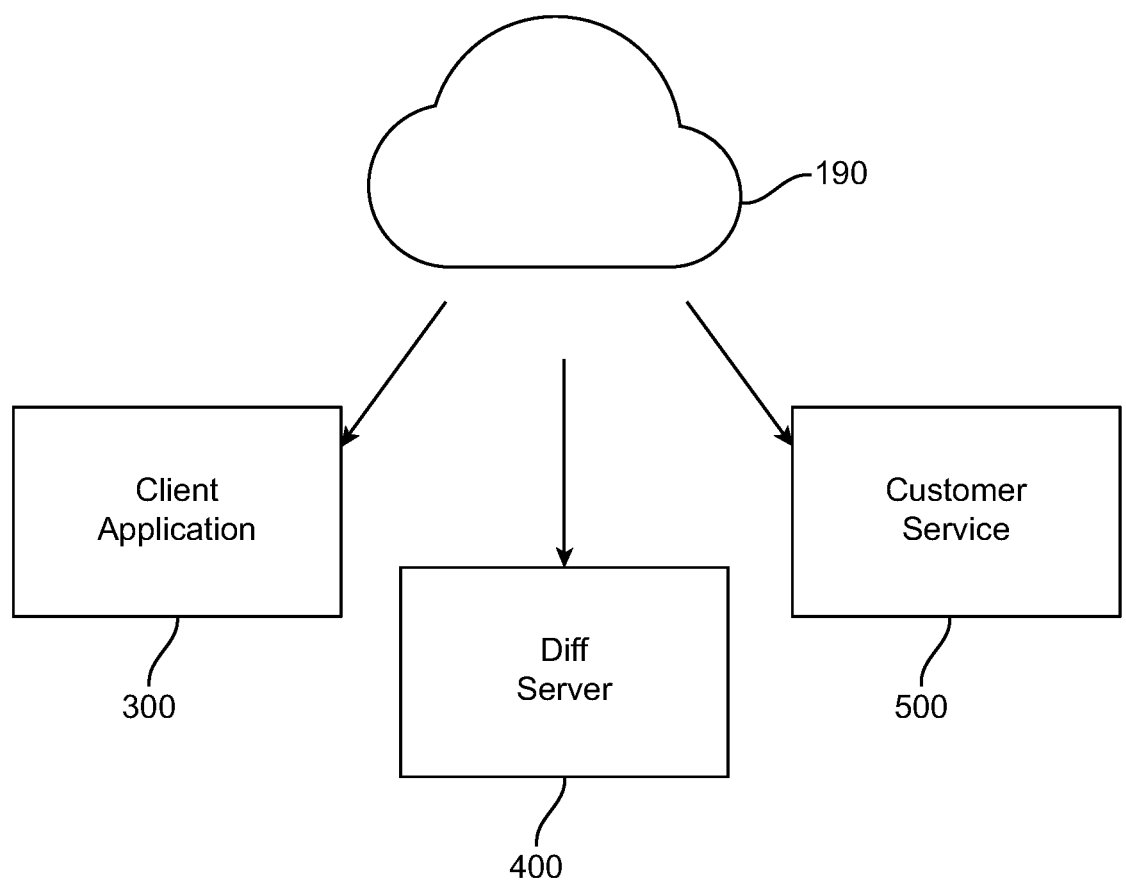
FIG. 2 is an illustration of the components of the present computer system communicating through a network and incorporating a client application, a customer's web service and a differential (diff) server that operates between the client application and the customer's web service.

In some embodiments, the application instructions 140 can be downloaded to a computing/processing device from a computer readable storage medium, or to an external computer or external storage device via a network 190 (FIG. 2). A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments the computer system 100 comprises a network interface 165 to communicate with a network 190 (FIG. 2). In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet).

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system and method can be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 2 illustrates the components of the present computer system communicating through network 190 and incorporating a client application 300, a customer's web service 500 and a differential (diff) server 400 that operates between the client application 300 and the customer's web service 500. It is to be understood that differential server 400 may either be a separate computer system from web service 500 (as illustrated in FIG. 2), or it may be a computer system incorporated into web service 500, all keeping within the scope of the presently claimed system.

In the various preferred aspects described herein, web service 500 can be any or all of a web service, a data layer, a single physical server or a plurality of separate physical machines operating together as one logical server, all keeping within the scope of the presently claimed system. Accordingly, any reference to web service 500 or web server 500 herein is understood to make reference to all of these possible systems and configurations.

In various embodiments, the present computer system/client application 300 in FIG. 2 is accessible via the network 190 and is locally embedded in one or more user computing device(s) 100, one or more third-party service device(s) 500, and/or the differential server 400. In some embodiments, the differential server 400 is connected to and accessible by an administrative device, which is configured, for example, to carry out any updates are required or to program any further implementations. In some embodiments, each of the one or more user computing device(s) 100 interacts with each of the other user computing device(s) 100 locally or remotely through the network 190. In some embodiments, each of the one or more user computing device(s) 100 interacts with the differential server 400 and the third-party server 500 remotely. In some embodiments, the third-party service 500 is an existing server for the application 300 operating on the user device 100. It is to be understood that the present three main components (application 300, differential server 400 and client third party device/service/server 500 can optionally all be co-located on one device, or even inside one process.

Client application 300 is a mobile, desktop or web application, or any other type of client-side application in a client/server system, and is what the user sees and interacts with. Customer's web service/server 500 may optionally be a standard web service that backs any mobile or web application. Customer's web service/server 500 preferably interacts with one or more databases, and other backend components like queues, mail servers, etc. It can be one physical device, but more commonly many, networked together and acting as one logical device. Lastly, differential server 400 operates as an intermediate web server that conceptually sits "between" the client application 300 and the customer service/server 500, as will further be explained. Customer's web service/server 500 is described in this document as one device, but is more typically many devices networked together and acting as one. Differential server 400 is modeled in this document as one device but more typically many devices networked together and acting as one.

In some embodiments, the third-party service/server 500 is a standard representational state transfer (REST), GraphQL, or other appropriate web service architectures. In some embodiments, as will be further explained, the third-party service service/server 500 is configured to maintain a mapping from the client ID to the last mutation ID, implement an interface to fetch a user's key and value pairs, and implement an interface to execute a batch of upstream transactions.

Figure 3:
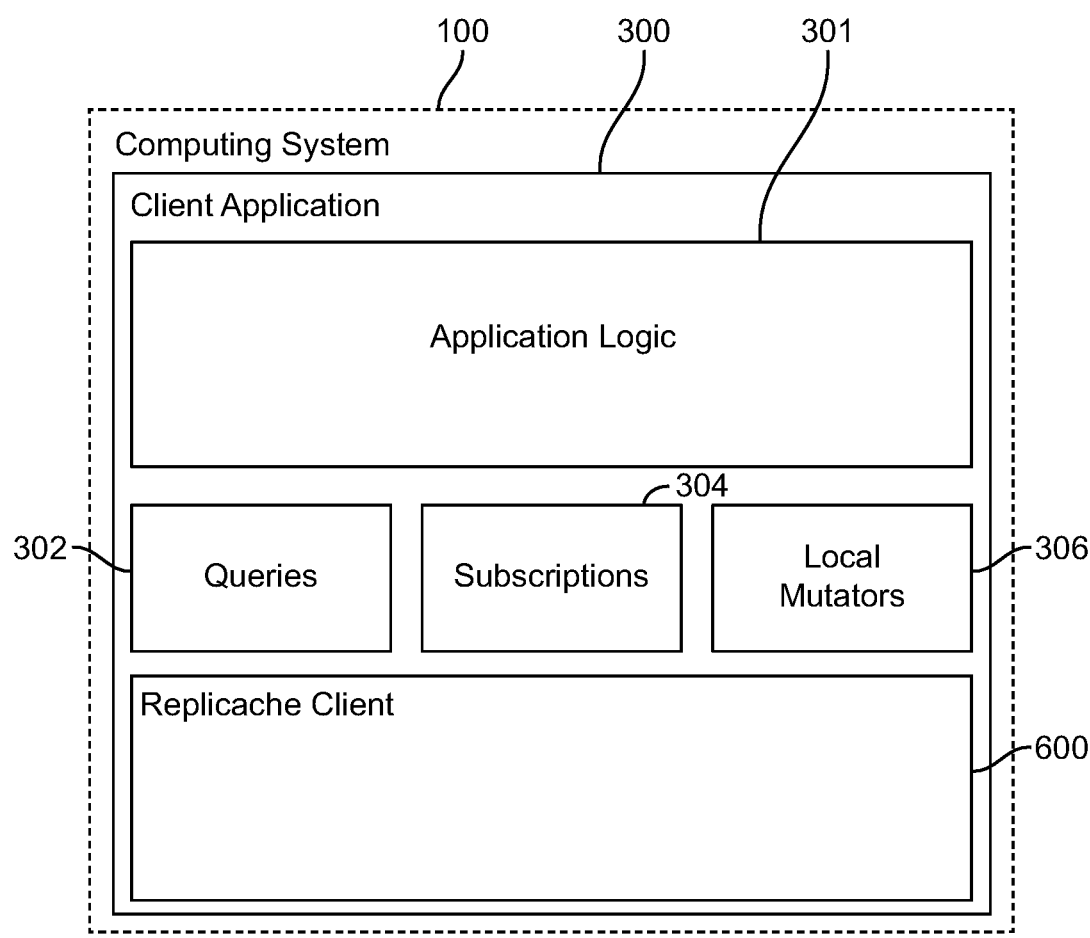
FIG. 3 is an illustration of a preferred embodiment of the client application incorporating application logic, a client software library (labelled herein as "Replicache client"), queries, subscriptions and local mutators.

FIG. 3 is an illustration of a preferred embodiment of the client application 300 incorporating application logic 301, a client software library (labelled "Replicache client" 600 in FIG. 6), queries 302, subscriptions 304 and local (i.e.: client) mutators 306. The application logic 301 provides a user interface, responds to user events and generally implements any client-side processing required for application 300. A client software library (labelled "Replicache client" 600 in FIG. 6) is also included and is used to store persistent data in it so that it can be accessed and modified locally (such that network round trips are not required). This facilitates bidirectional sync with the customer service/server 500. In preferred aspects, the Replicache Client 600 can expose data models including but not limited to key/value interfaces, document databases, relational, hierarchical or a graph databases or any other type of data abstraction.

Application 300 also preferably includes queries 302, subscriptions 304 and local mutators 306 through which application logic 301 reads and writes data to Replicache client 600. In preferred aspects, queries 302, subscriptions 304 and local mutators 306 get a stable view of the cache 605. Queries 302 are one time reads, and subscriptions 304 are standing reads that first execute when the subscription is activated, and then execute again if the cache subsequently changes (either due to local changes or to synchronization). Local mutators 306 are used to change the data stored in cache 604. Each Local Mutator 306 has a unique name—its Mutator Name—and accepts zero or more arguments defined by the application developer. While a mutator is running it has exclusive access to the cache and can make arbitrary changes to the data in it.

Figure 4:
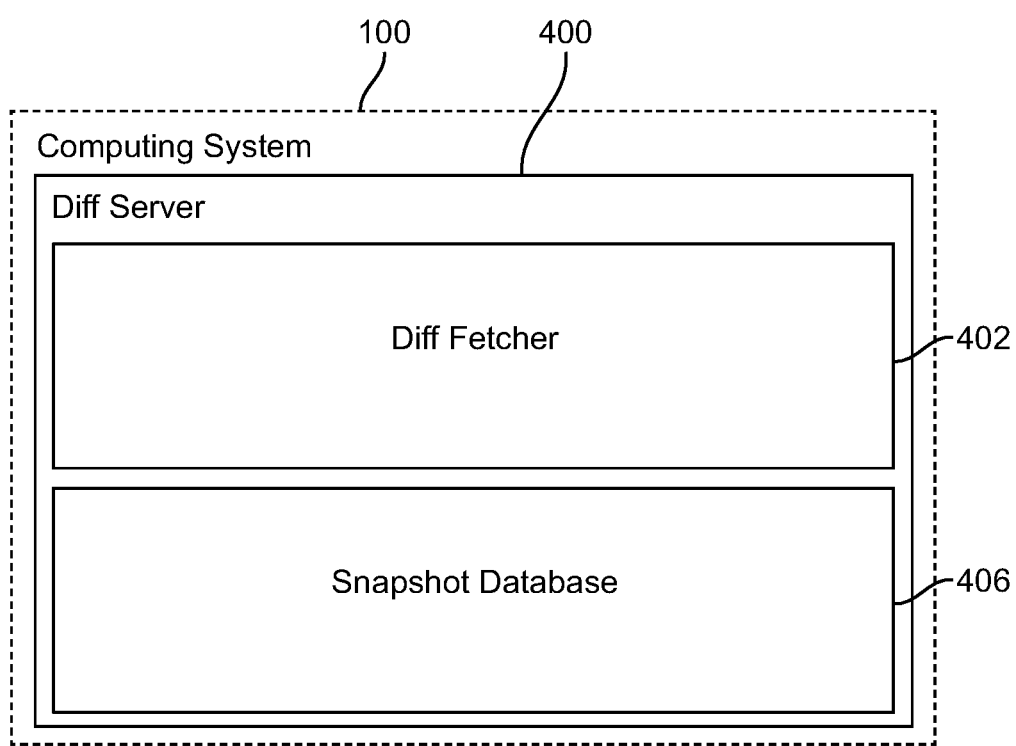
FIG. 4 is an illustration of a preferred embodiment of the diffserver incorporating a differential fetcher interface and a snapshot database.

FIG. 4 is an illustration of a preferred embodiment of the differential server 400 incorporating a differential fetcher interface 402 and a snapshot database 406. Historical snapshots of the caches of each user's application 300/computer system 100 are stored in differential server 400. (It is to be understood that FIG. 1 illustrates only one user's system, but that a plurality of different users (each operating computer platform/application 200 on their own mobile or other devices) will all be in communication with differential server 400 and the customer service/server 500. Accordingly, an advantage of the present system is that Application Developers do not have to track changes in the data in customer service/server 500 over time. As a result, there is no need for the Application Developers to generate instructions moving clients to the latest data state. Instead, customer service/server 500 simply preferably returns a snapshot of the current state of the cache 604 to the differential server 400, and the differential server 400 then compares this to the previous version, and generates a "server differential". The differential server 400 stores a mapping from the client ID to a listing of snapshots. For each client's snapshot, the differential server 400 preferably stores the cache state, a last mutation ID and a checksum over the state. As mentioned above, it is to be understood that the present system encompasses embodiments both where the differential server 400 is a separate physical server from server 500, and embodiments where the differential server 400's is embodied within or incorporated into the programming in service/server 500.

The differential fetcher 402 is called by a puller 603 in the Replicache Client 600 to get the "server differential" that is then used to bring the application up to date with the latest snapshot that the differential server 400 has stored for that particular client 300.

Figure 5:
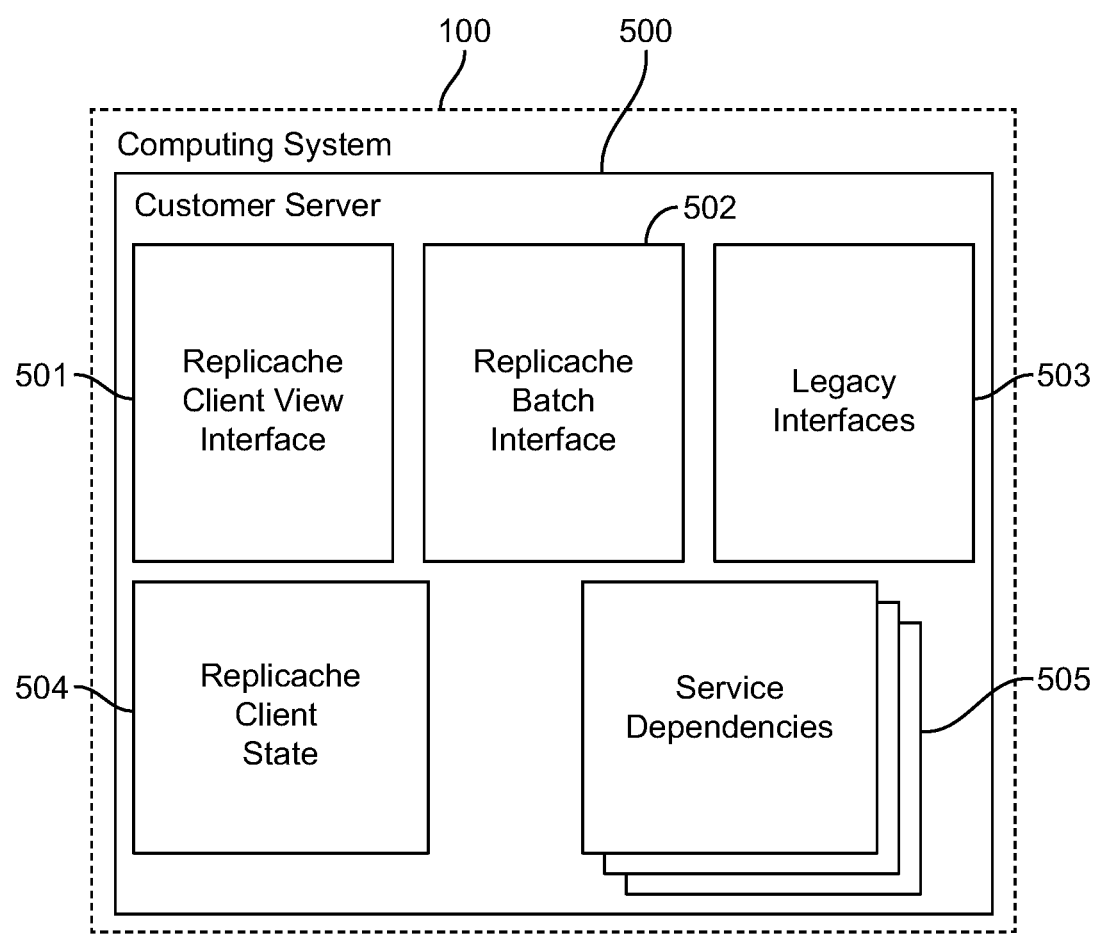
FIG. 5 is an illustration of a preferred embodiment of the customer's web service, incorporating various interfaces, a client state (which maps from a Client ID to a Last Mutation ID) and various service dependencies.

FIG. 5 is an illustration of a preferred embodiment of the customer's web service/server 500, incorporating various interfaces 501, 502, 503, a client state database 504 (that maps from a Client ID to a Last Mutation ID) and service dependencies 505. The Replicache Client View Interface 501, and the Replicache Batch Interface 502 are used together to implement a preferred synchronization protocol, as follows.

The Replicache Client View Interface 501 is called by the differential server 400 to pull data from customer service/server 500 to the differential server 400, and then on, to the client application 300. The Replicache Client View Interface 501 returns a snapshot of the data in the particular client's cache at the moment it is called. As such, it returns all current values in the cache 604, regardless of what state the client cache was previously in. This is very advantageous for Application Developers since they do not have to track changes as they build the Applications. It is also advantageous since the Client View interface 501 will naturally reflect changes made through Legacy Interfaces, even though those changes did not originate via the present synchronization protocol. In this way it is possible for Application Developers to incrementally adopt the present system and not have to change all interfaces in their system at once.

The Batch Interface 502 is called by the Replicache Client 600 when it wants to push new data changes from client application. In preferred aspects, Batch Interface 502 accepts a batch of mutations 306 from the client 300. The changes received at the batch interfaces 502 are abstract descriptions of changes that need to be executed by customer service/server 500. Mutations 306 do not describe the actual changes to make to databases or other dependent services. This is advantageous to Application Developers since it allows them to execute these changes in whatever way makes most sense for their service, and not related to how the change is realized on the client device. Application Developers can use whatever complex processing logic they want as long as (a) the present system correctly updates the last Mutation ID, and (b) the present system correctly reflect whatever changes mutations 306 make in the Client View interface 501. This is advantageous because it allows rich and defensive handling of any type of conflict or invariants.

For example, a calendaring service could check its own databases for conflicts, but might also check with third-party services for conflicts. Thus, the present local mutators 306 that are made in the client application 300 are actually speculative implementations of the mutations, whereas the mutations made on customer server/service 500 are authoritative. As a result, it does not matter if the speculative local mutators 306 arrive at a different answer than the authoritative server-side ones, except in so far as it might be confusing to users (and thus should be dealt with in the user interface). Whatever the system/server 500 decides the result of a transaction is, the present system will faithfully propagate to each of the clients via their own client view interface 501 and the differential server 400. This is advantageous to application developers since they do not have to attempt to ensure that the client side implementation of transactions exactly matches the functionality of the server-side implementation.

The Replicache Client State 504 maps Client ID to a Last Mutation ID. This advantageously permits customer service/server 500 to know which mutations it has already processed, and avoids the (all too common problems of) processing mutations more than once or skipping mutations. Legacy Interfaces 503 can optionally be in in REST, GraphQL, Protocol Buffers, or many other formats.

Figure 6:
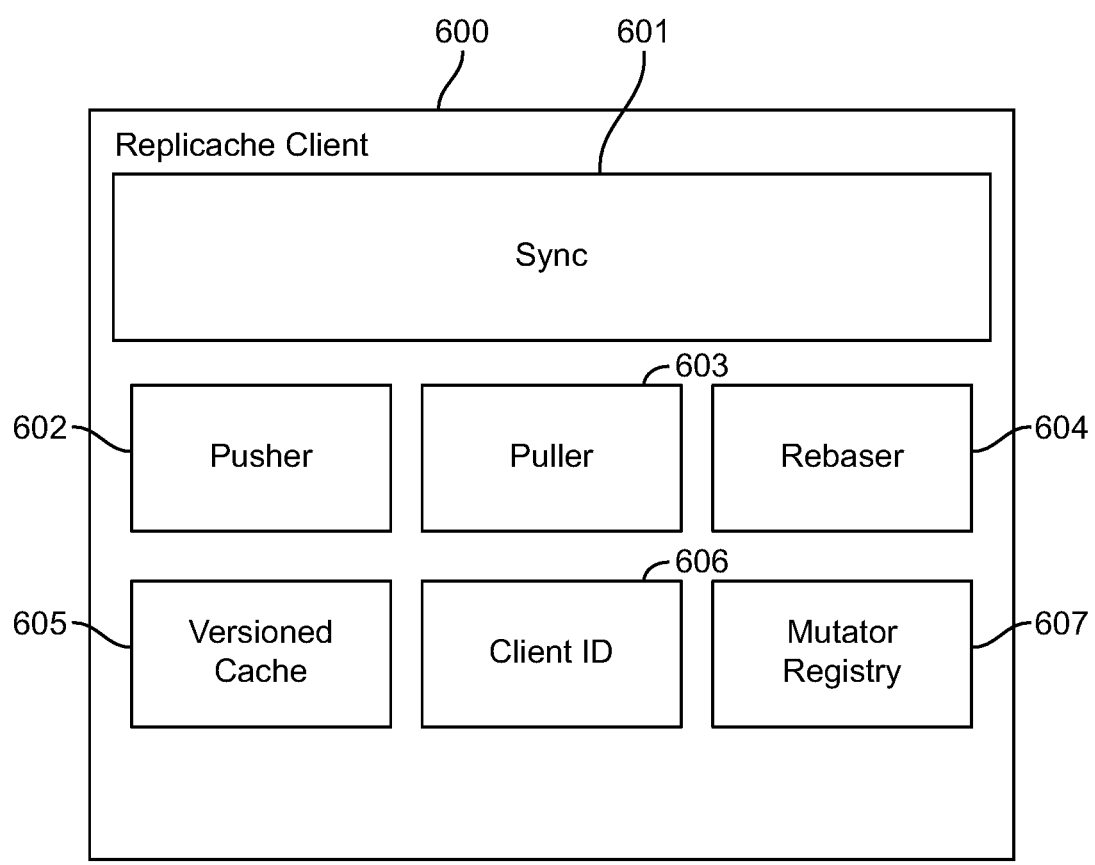
FIG. 6 is an illustration of a preferred embodiment of the client (labelled herein as the "Replicache client"), which is a software library having a versioned cache with optional branches each associated with its own commit, with associated pusher, puller and a Rebaser for resolving conflicts.

FIG. 6 is an illustration of a preferred embodiment of the client software library (labelled "Replicache client 600"), having a Versioned Cache 605 with optional branches each associated with its own commit, with associated Pusher 602, Puller 603 and a Rebaser 604 for resolving conflicts. The Replicache Client library 600 is a software library that may optionally be embedded into customer applications, or used by customer applications via other mechanisms. The Replicache Client library 600 preferably is a versioned cache that may have zero or more named branches, each of which is associated with a "commit" (being an immutable snapshot of the state of the cache at a point in time). Preferably, one branch in the cache is referred to with the name "main", which is the state that the UI is currently interacting with. There can also be one or more named branches related to syncs that are in progress.

In preferred aspects, when changes are made to the cache 605, rather than modifying the commit associated with a branch, a new commit is made with the new data in it, and the branch is modified to point to the new commit instead of the old one. Preferably, each commit includes two pieces of metadata, being a predecessor commit which represents the prior state of the cache (if any), and a checksum over the state of the cache at that moment.

In preferred aspects, the commits may comprise pending commits representing changes made to the client device (and which are not yet known to have been processed by the customer server). Optionally, pending commits may also store mutator names, mutator arguments, and mutation IDs (an integer identifier that uniquely identifies a particular mutation with a particular client). Mutation IDs are advantageous in ensuring that customer service/server 500 executes mutations in order without any mutation being skipped.

In other aspects, the commits may comprise snapshot commits that represent authoritative versions of the cache that were received from the server during synchronization. Optionally, snapshot commits may also store last mutation IDs (which identify the mutation processed before the snapshot was created). An advantage of such mutation IDs is that they allow pending mutations to be discarded if they have already been processed by customer service 500.

The Replicache Client 600 also preferably additionally stores a unique randomly generated Client ID (such that particular mutations can be associated with particular clients in the network). Additionally, the Replicache Client 600 preferably maintains a Mutator Registry 607 which is a mapping of unique names to Local Mutators.

Other optional components in client 600 can include Pusher 602 (for pushing mutations to customer service 500); Puller 603 (for pulling new cache snapshots from customer service 500 via diff server 400). Lastly, Rebaser 604 preferably resolves conflicts by replaying pending changes after a pull.

Having set forth a description of the various components and processes of the present system above, the operation of the entire system will now be set forth such that the interworking of preferred aspects of the system can be understood.

In preferred aspects, the present system provides a system to synchronize application data bidirectionally between N clients and one server. First, a computer system is provided N clients 300 and a server 500.

Each client 300 comprises a pusher 602 that pushes mutations 306 made in client 300 to server 500. Each mutation 306 is preferably comprised of a mutation name identifying the type of mutation, and arguments provided by the application modifying the behavior of the mutation. In addition, pusher 602 also pushes a client ID and mutation ID for each mutation to server 500. Each client 300 also comprises a puller 603 that pulls server differentials to client 300.

Importantly, each client 300 also is provided with a versioned cache 605 that: (a) stores key/value pairs, wherein the keys are text strings and the values are data provided by an application in the client, (b) is versioned to store historical versions of the key/value pairs, and (c) is forkable to store parallel historical versions of the key/value pairs.

Lastly, each client 300 is also provided with the present novel rebaser 604 that resolves conflicts between the client and the server. Rebaser 604 operates by: (a) forking the cache to create a synch branch when the client 300 receives the latest server differential, (b) applying the latest received server differential to the synch branch, (c) applying only those mutations 306 to the synch branch that have not already been acknowledged by the server 500, and then (d) making the synch branch the main branch of the cache. In operation, branches of the cache are removed from client system memory when the branches are no longer reachable. Also, the data no longer needed by a deleted branch is also removed. This present novel approach to conflict resolution advantageously conserves computing resources.

In optional embodiments, the present system also includes a system for iteratively generating the server differentials by comparing snapshots of the server at consecutive periods of time; although it is to be understood that there are alternate ways of calculating or generating the server differential, and that all are encompassed within the scope of the present claims. Moreover, the system for iteratively generating the server differentials can either be: (a) a computer system located within the server 500 such that the server differential is pulled directly from the server 500 to the client 300, or a computer system located within a differential server 400 that is separate from the server 500 such that the server differential is pulled directly from the differential server 400 to the client 300.

In preferred aspects, the client mutation IDs are generated as sequential integers corresponding to sequentially performed mutations 306. The client mutations 306 and their associated mutation IDs are continuously pushed to server 500 without waiting for the server 500 to respond to the client 300. As such, mutations 306 can still be made to each of the clients 300 even if communication is interrupted between the server 500 and the client(s).

In preferred aspects, server 500 is an authoritative server that receives the client mutations 306 from each of the N clients and then determines whether each of the received client mutations 306 can be executed on the server, or whether to modify the mutation before executing it. The server 500 executes each of the mutations sequentially, mapping the received mutations 306 to the individual clients by the client ID and the client mutation ID. As a result, the received client mutations that cannot be executed on server 500 are not applied for all of the N clients; and the received client mutations that can be executed on server 500 are applied in the same order across all of the N clients. Most preferably, each of client mutations 306 comprise a mutation name, a mutation ID and a mutation argument.

In optional preferred aspects, the server differential is generated as a map of changes to the key/value pairs in the versioned cache in the client. Preferably, a cookie is sent to client 300 with each server differential, and the server differential is generated for each of the N clients by reading the cookie sent to the particular client and the last client mutation ID received from that particular client.

When operating as an authoritative server, server 500: (a) incorporates programming that represents each mutation name that is sent by clients, (b) decides whether to apply, modify, or reject each mutation, such that (c) the resulting changes to the server state are sent to each of the other N clients in the pulled server differentials, thereby updating each of the N clients. Advantageously, each of the N clients 300 send their own mutations 306 to the server 500 without waiting to communicate with other clients. Moreover, the server 500 is synchronized to the N clients 300 when the client mutations 306 pushed to the server have been executed on server 500.

The present system also provides a method of bi-directional synchronization between N clients and a server, by: (a) providing a computer system comprising N clients 300 and a server 500; (b) for each of the N clients 300: (i) pushing mutations 306 made in client 300 to server 500, while simultaneously pushing client IDs and client mutation IDs for each mutation to the server; (ii) pulling server differentials to the client; (iii) storing key/value pairs in a versioned cache, wherein the keys are text strings and the values are data provided by an application in the client, (iii) storing historical versions of the key/value pairs in the versioned cache, (iv) applying a rebaser 604 to resolve conflicts between the client 300 and the server 500 by: forking the cache 605 to create a synch branch when the client receives the latest server differential, applying the latest received server differential to the synch branch, applying only those mutations 306 to the synch branch that have not already been acknowledged by server 500, and then making the synch branch the main branch of cache 605.

In optional aspects, the server differential is iteratively generated by comparing snapshots of the server at consecutive periods of time.

Advantageously, the client mutations 306 and their associated mutation IDs are continuously pushed to server 500 without waiting for the server 500 to respond to the client 300. The server 500 then selects the client mutations 306 to analyze based upon the associated sequential mutation ID for each of the N clients such that the server analyzes the most recent successive mutation that has not previously been analyzed for each of the N clients. As a result, each of the N clients 300 is synchronized to server 500 independently of the server being synchronized to each of the N clients such that server and client synchronization can be carried out over different periods of time.

Figure 7:
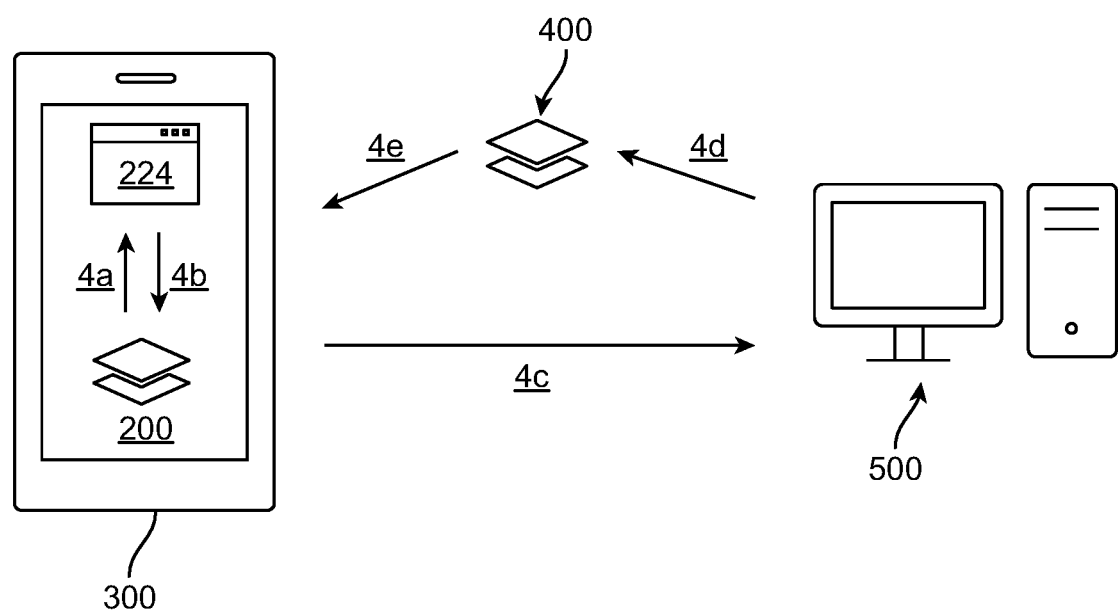
FIG. 7 is an illustration of data flow between the client application, the customer's web service and the diff server.

FIG. 7 is an illustration of data flow between the client application 300, the customer's web service 500 and the differential server 400.

The components and functionality of the application platform 300 can be further understood in the context of the data flow diagram shown in FIG. 7. Referring to FIG. 7, a user computing device (client) 300 is shown on the left and a third-party service device (server) 500 is shown on the right. Positioned between the client 300 and server 500 is the differential server 400. In some embodiments, the client computing device comprises the application platform 300, which runs at least in part inside a web app or mobile app 224 along with the differential server 400. In some alternate embodiments, the differential server 400 also runs alongside the existing server 500.

At step 4a, the Application Logic 301 reads from the local cache 605 using queries 302 and subscriptions 304. At step 4b, the Application Logic 301 writes to the local cache 605 using client-side mutators 306. At step 4c, pusher 602 in the client 600 pushes batches of mutations 306 to the customer service/server 500. At step 4d, service/server 500 sends a new snapshot of the cached client state to differential server 400. At step 4e, puller 603 requests a new differential from the differential server 400.

When new branches of the cache need to be created, rebaser 604 forks the cache 605 and then rebases any pending commits, and swaps in the new branch.

Figure 8:
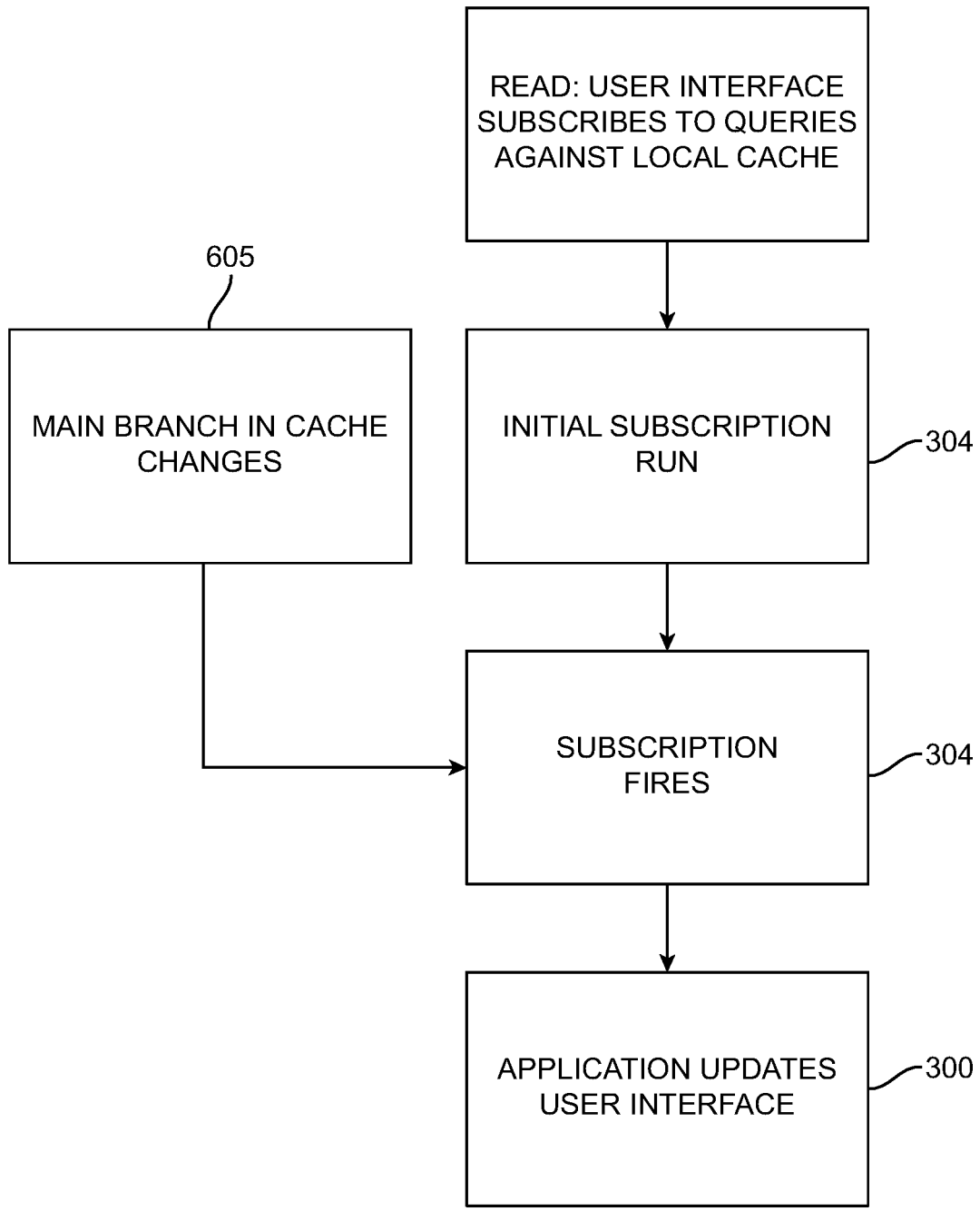
FIG. 8 is a flowchart illustrating how subscriptions are executed against the present application software library.

FIG. 8 is a flowchart illustrating how subscriptions 304 are executed against the present Replicache Client 600. Specifically, Application Logic 301 first registers a subscription 304 to a query 302. The query 302 may simply be a function in some programming language running inside a transaction. A subscription 304 preferably also contains a way to call back into application 300 with the results of the query 302. Next, the query 302 is executed, and the subscription 304 executes, and application logic 301 updates the user interface 501. Later if there is ever a change to the main branch of the cache 605, the subscription 304 re-fires with the new results.

Figure 9:
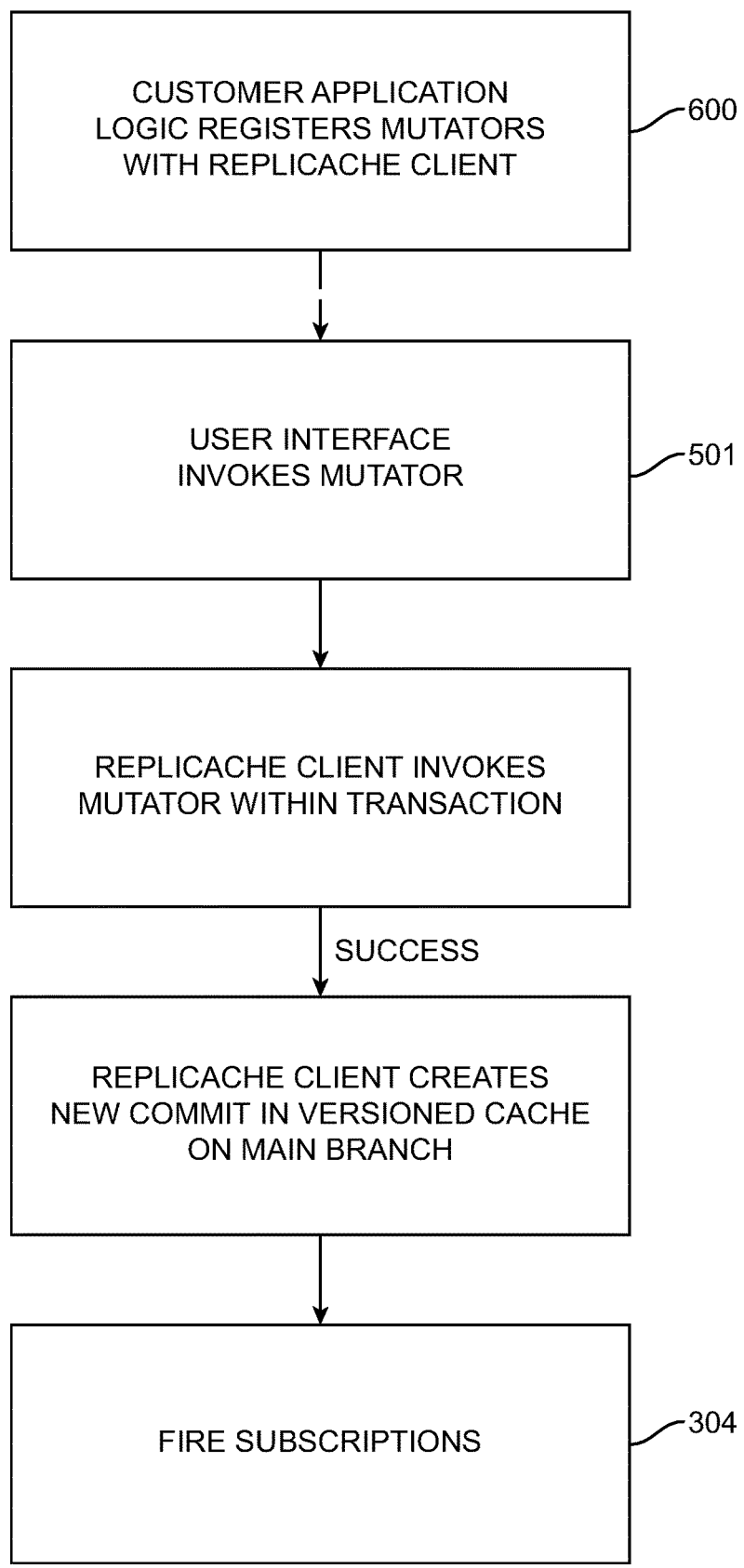
FIG. 9 is a flowchart illustrating how mutations are executed against the present application software library.

FIG. 9 is a flowchart illustrating how mutations are executed against the present client 300. First, application logic 301 registers a client-side mutator function 306, which gets stored in the client's mutator registry 607. Next, the user interface 501 is used to execute the mutator 306. If the mutator function successfully executes, the transaction creates a new pending commit. Preferably, this new commit will have metadata including the mutationID (i.e.: the "next" mutation ID in sequence), a mutator name, the mutator arguments, and a checksum over the current state. Next, the main branch is updated to refer to the new commit. If the transaction resulted in a change to the cache, then subscriptions are re-run and potentially re-fired.

Figure 10:
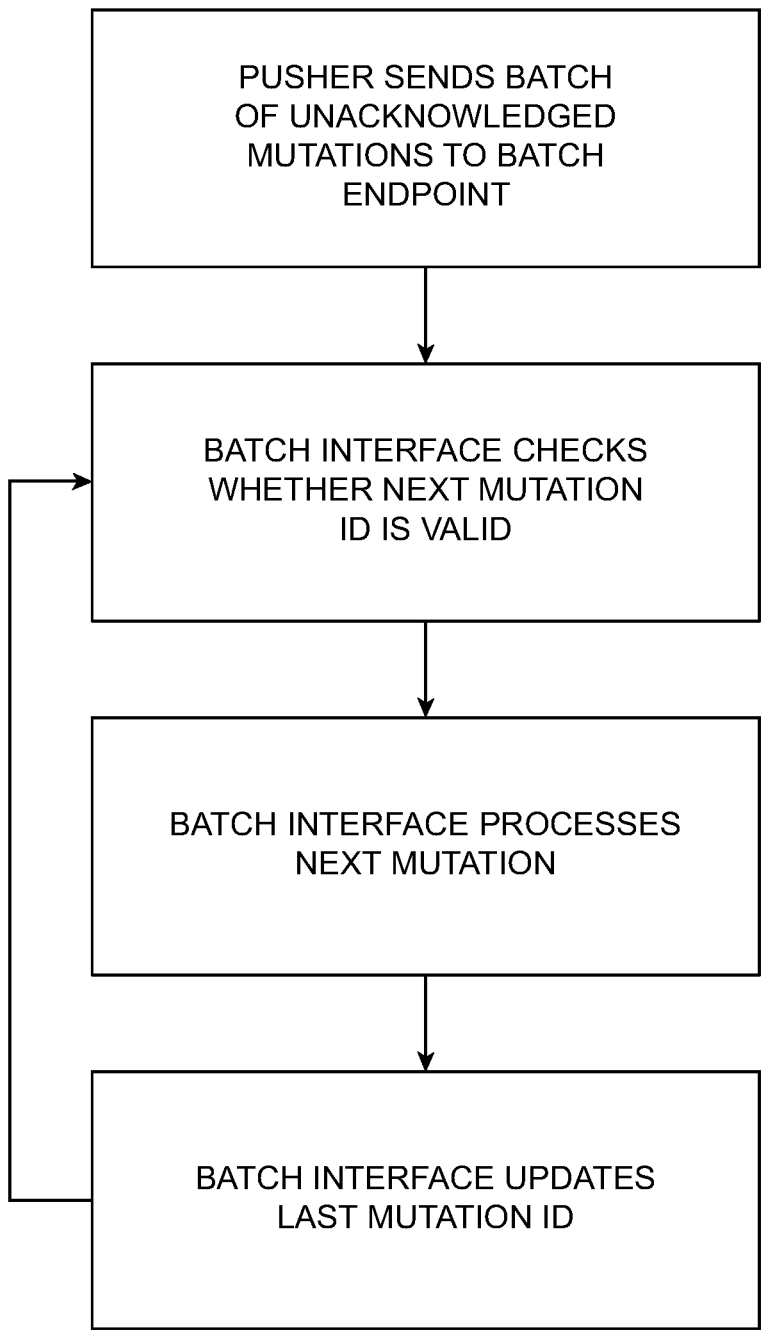
FIG. 10 is a flowchart illustrating upstream (i.e.: client to server) synchronization.

FIG. 10 is a flowchart illustrating upstream synchronization. First, batches of mutations are periodically sent by pusher 602 to batch interface 502 on Customer Service 500. This is preferably accomplished by gathering all pending transactions whose mutation ID is greater than the last MutationID of the latest snapshot commit. Next, batch interface 502 checks and validates whether the next mutation has a mutation ID that is exactly 1 greater than the last processed mutation ID for the requesting client. If the mutation ID of the next mutation is less than or equal to the last processed mutation ID, then that mutation is silently skipped because it has already been processed. If the mutation ID is greater than the last mutation ID plus 1, then an error is returned to the client. Next, batch interface 502 processes the mutation 306. Typically, the mutation will be implemented by making changes to various backend databases, data stores, or dependent services. Finally, after the mutation 306 has been processed completely, batch interface 502 will increment the last processed mutation ID to record the mutation was completely processed. This process repeats for each of the mutations sent in a batch.

Figure 11:
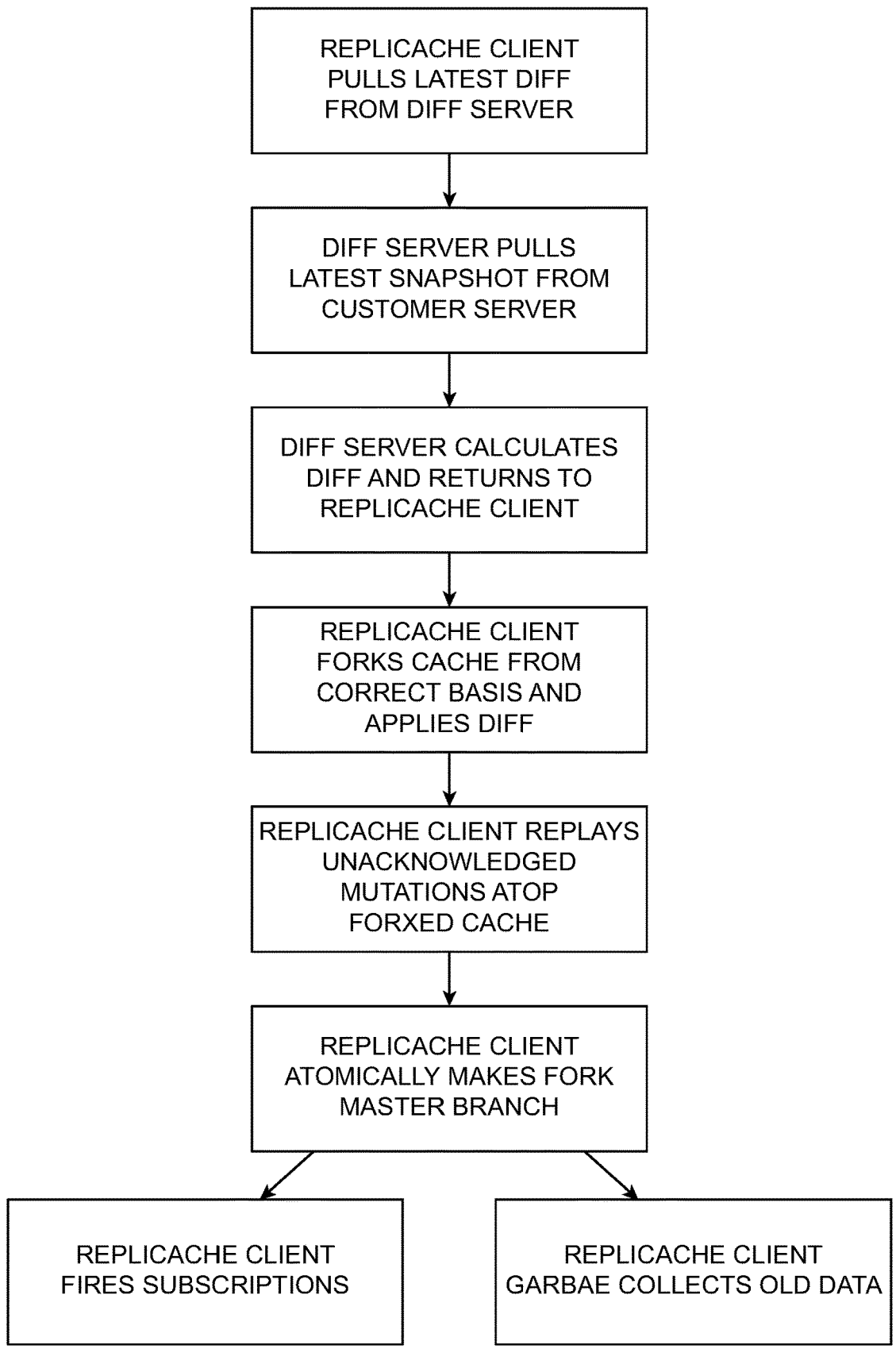
FIG. 11 is a flowchart illustrating downstream (i.e.: server to client) synchronization.

FIG. 11 is a flowchart illustrating downstream synchronization. First, Client 600 fetches a new differential from the interface of the differential server 400. Client 600 then passes the snapshot ID of the latest snapshot commit that it has as the basis, as well as its own unique client ID. In turn, the differential server 400 then requests a new snapshot from the Client View Interface 501 in customer service/server 500 (and also passes the Client ID of the requesting client). The customer service/server 500 then generates and returns this snapshot as well as the last Mutation ID it has stored in the client state 504 associated with this particular client. The differential server 400 stores the new snapshot and assigns it a unique ID. It also stores the last Mutation ID in the same record.

The differential server 400 locates the snapshot associated with the specified basis ID. If found, differential server 400 calculates a difference between the basis snapshot and the new snapshot. This difference is returned, along with the new snapshot ID and associated last Mutation ID to client puller 603. If the basis snapshot is not found, the difference simply returns a difference that includes the entire snapshot. The client puller 603 then forks the cache 605 at the basis. That is, the system creates a new unique branch for this synchronization whose commit is the basis commit. It then applies the difference returned from the differential server 400 to get the latest snapshot. It then creates a new snapshot commit pointing at the new snapshot and including the snapshot ID and last Mutation ID. It also preferably recalculates the checksum after applying the difference to ensure it matches the checksum provided by differential server 400.

Rebaser 604 then locates any pending commits in the main branch that have not yet been reflected in the new snapshot on the synchronization branch. This can be determined because they have IDs greater than that commit's last Mutation ID. Rebaser 604 replays each of these mutations 306 in order by invoking the associated local mutator function inside a transaction against the latest commit in the synchronization branch. After each mutation 306 is replayed, Rebaser 604 creates a new pending commit recording the replayed mutation. Finally, once all pending mutations have been replayed, rebaser 604 sets the main branch to have the same commit as the synchronization branch. In this case, because the main branch changed, all subscriptions will refire. The rebaser 604 then deletes the old, no longer synchronized branch, and deletes any data from the cache that can no longer be reached (because the only reference to it was from the old sync branch).

In further embodiments, the server differential is created by storing a last modified date in each row of the server database, and sending the highest such current value as a cookie in server differentials. In subsequent pull requests, the server differential can by including in only such rows that have a higher last-modified date than the one provided in the cookie. The server differential can be created by maintaining a global sequence number for the entire server database, and putting that sequence number as an additional attribute of each row of the server side database. The sequence number can then be modified on each change to the server-side database, and the sequence number can be included in the cookie returned in the server differential, and wherein a next server differential can then be calculated by returning only rows which have a sequence number higher than the provided.

The server differential can optionally be created by associating a version identifier with each row in the server side database, and the version identifier can be an incrementing integer or a hash of the row of the content, or a randomly generated string, and wherein when returning a server differential to the client. The server can include a table of all keys plus their version identifiers as the cookie. When the pull requests happens, the server can use the table to find modified rows in the database. If the summary table is too large, smaller summaries can be generated by e.g., using Bloom Filters. Alternately the summary table can be stored in a database server side with a unique ID and then only that unique ID can be sent to the client as the cookie.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the flowchart and block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Web browsers and/or the like. Each application generally has its own user interface that allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse).

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. All computer operating systems, such as Windows, Unix, and the Mac OS, usually provide an application program interface for software programmers. APIs are also used by hardware devices that can run software programs. While the API makes the programmer's job easier, it also benefits the end user, since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

The term "add-on" or "plug-in" as used herein refers to computing instructions configured to extend the functionality of a computer program, where the add-on is developed specifically for the computer program. The term "add-on data" refers to data included with, generated by, or organized by an add-on. Computer programs can include computing instructions or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system to synchronize application data bidirectionally between N clients and one server, comprising:
   (a) a server;
   (b) a system for determining a server differential, the server differential being a snapshot of the most recent operating state of the server compared to a previous snapshot of the operating state of the server; and
   (c) a plurality of N clients, wherein each of the N clients comprises:
      (i) a pusher that pushes sequential mutations made in the client to the server,
      (ii) a puller that pulls the server differential to the client,
      (iii) a versioned cache that stores sequential mutations made in the client, wherein the versioned cache is forkable to store parallel historical versions of the cache, and
      (iii) a rebaser that resolves conflicts between the server and the client by:
         forking the versioned cache to create a synch branch when the client receives the server differential,
         applying mutations to the synch branch, wherein the mutations applied to the synch branch are mutations that have not previously been received from the server, and then
         making the synch branch the main branch of the cache.

2. The system of claim 1, wherein the rebaser removes data in unreacheable cache branches from system memory.

3. The system of claim 1, wherein the server decides whether to apply, modify or reject each mutation received from each of the N clients.

4. The system of claim 3, wherein mutations applied by the server are then applied across all of the N clients in the same order they were applied by the server.

5. The system of claim 1, wherein the server differential is determined iteratively by taking iterative snapshots of the operating state of the server.

6. The system of claim 1, wherein the client mutations are continuously pushed to the server without waiting for the server to respond to the client.

7. The system of claim 1, wherein the server stores the mutations received from each of the clients by both a client ID and by a sequential mutation ID.

8. The system of claim 1, wherein each client is independently synchronized to the server such that different mutations can be made at different times to different clients without the clients having to communicate with one another.

9. The system of claim 1, wherein the server differential comprises a numerical sequence of mutations made in the server.

10. The system of claim 9, wherein the server differential is sent to the client in a cookie that identifies the last mutation received from the client.

11. The system of claim 1, wherein the system for determining the server differential is:
   resident in the server, or
   resident in a differential server.

12. The system of claim 1, wherein the server does not re-execute client mutations it has already received.

13. The system of claim 1, wherein the server is one of a web service, a data layer, a single physical server or a plurality of separate physical machines operating together as one logical server.

14. The system of claim 1, wherein each mutation is comprised of a mutation name identifying the type of mutation and arguments provided by a client application modifying the behavior of the mutation.

15. The system of claim 1, wherein the versioned cache stores key/value pairs, and wherein the keys are text strings and the values are data provided by an application in the client.

16. The system of claim 1, wherein the server selects the client mutations to analyze based upon the associated sequential mutation ID for each of the N clients such that the server analyzes the most recent successive mutation that has not previously been analyzed for each of the N clients.

17. The system of claim 1, wherein the server differential generated for each of the N clients is calculated from a cookie sent to the particular client and the last client mutation ID received from that particular client.

* * * * *